United States Patent
Sharma et al.

(10) Patent No.: US 8,295,597 B1
(45) Date of Patent: Oct. 23, 2012

(54) METHOD AND SYSTEM FOR SEGMENTING PEOPLE IN A PHYSICAL SPACE BASED ON AUTOMATIC BEHAVIOR ANALYSIS

(75) Inventors: Rajeev Sharma, State College, PA (US); Satish Mummareddy, Washington, DC (US); Jeff Hershey, Norfolk, VA (US); Namsoon Jung, State College, PA (US)

(73) Assignee: VideoMining Corporation

( * ) Notice: Subject to any disclaimer, the term of this patent is extended or adjusted under 35 U.S.C. 154(b) by 1265 days.

(21) Appl. No.: 12/075,089

(22) Filed: Mar. 7, 2008

Related U.S. Application Data

(60) Provisional application No. 60/906,951, filed on Mar. 14, 2007.

(51) Int. Cl.
*G06K 9/00* (2006.01)
*G06K 9/62* (2006.01)
*G06K 9/34* (2006.01)

(52) U.S. Cl. ......................... 382/173; 382/224

(58) Field of Classification Search .................. 382/103, 382/164, 173, 209, 218–220, 224, 294; 375/240.08, 375/240.11, 240.16; 348/143, 150, 155, 348/169; 340/572.4, 572.7, 745; 704/270; 705/10; 706/12, 25, 47, 59; 715/862, 863
See application file for complete search history.

(56) References Cited

U.S. PATENT DOCUMENTS

| | | | |
|---|---|---|---|
| 6,741,973 B1 | 5/2004 | Dove et al. | |
| 6,990,217 B1 | 1/2006 | Moghaddam et al. | |
| 7,006,982 B2 | 2/2006 | Sorensen | |
| 7,049,965 B2 * | 5/2006 | Kelliher et al. | 340/572.4 |
| 7,225,414 B1 * | 5/2007 | Sharma et al. | 715/863 |
| 7,227,893 B1 * | 6/2007 | Srinivasa et al. | 375/240.08 |
| 7,424,175 B2 * | 9/2008 | Lipton et al. | 382/294 |
| 7,526,102 B2 * | 4/2009 | Ozer | 382/103 |
| 2003/0002712 A1 | 1/2003 | Steenburgh et al. | |
| 2003/0053659 A1 | 3/2003 | Pavlidis et al. | |
| 2003/0058339 A1 | 3/2003 | Trajkovic et al. | |
| 2003/0110038 A1 | 6/2003 | Sharma et al. | |
| 2004/0113933 A1 | 6/2004 | Guler | |
| 2004/0120581 A1 | 6/2004 | Ozer et al. | |
| 2005/0286774 A1 | 12/2005 | Porikli | |

(Continued)

OTHER PUBLICATIONS

U.S. Appl. No. 60/808,283, Shama, et al.
U.S. Appl. No. 60/846,014, Shama, et al.

*Primary Examiner* — Amir Alavi

(57) ABSTRACT

The present invention is a method and system for segmenting a plurality of persons in a physical space based on automatic behavior analysis of the persons in a preferred embodiment. The behavior analysis can comprise a path analysis as one of the characterization methods. The present invention applies segmentation criteria to the output of the video-based behavior analysis and assigns segmentation label to each of the persons during a predefined window of time. In addition to the behavioral characteristics, the present invention can also utilize other types of visual characterization, such as demographic analysis, or additional input sources, such as sales data, to segment the plurality of persons in another exemplary embodiment. The present invention captures a plurality of input images of the persons in the physical space by a plurality of means for capturing images. The present invention processes the plurality of input images in order to understand the behavioral characteristics, such as shopping behavior, of the persons for the segmentation purpose. The processes are based on a novel usage of a plurality of computer vision technologies to analyze the visual characterization of the persons from the plurality of input images. The physical space may be a retail space, and the persons may be customers in the retail space.

24 Claims, 12 Drawing Sheets

U.S. PATENT DOCUMENTS

2006/0010028 A1 1/2006 Sorensen
2006/0053342 A1 3/2006 Bazakos et al.
2006/0221181 A1* 10/2006 Garoutte ..................... 348/143
2008/0159634 A1* 7/2008 Sharma et al. ................ 382/224
2009/0222388 A1* 9/2009 Hua et al. ....................... 706/12
2009/0310861 A1* 12/2009 Lang et al. .................... 382/173

* cited by examiner

METHOD AND SYSTEM FOR SEGMENTING PEOPLE IN A PHYSICAL SPACE BASED ON AUTOMATIC BEHAVIOR ANALYSIS

CROSS-REFERENCE TO RELATED APPLICATIONS

This application claims the benefit of U.S. Provisional Patent Application No. 60/906,951, filed Mar. 14, 2007.

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system for segmenting a plurality of persons in a physical space based on automatic behavior analysis of the persons in a preferred embodiment, and in another exemplary embodiment, the present invention can also utilize other types of visual characterization, such as demographic analysis, or additional input sources, such as sales data, to segment the plurality of persons. The processes in the present invention are based on a novel usage of a plurality of computer vision technologies to analyze the behavior and visual characterization of the persons from the plurality of input images.

2. Background of the Invention

Behavior Analysis

There have been earlier attempts for understanding people's behaviors, such as customers' shopping behaviors, captured in a video in a targeted environment, such as in a retail store, using cameras.

U.S. Pat. Appl. Pub. No. 2006/0010028 of Sorensen (hereinafter Sorensen 1) disclosed a method for tracking shopper movements and behavior in a shopping environment using a video. In Sorensen 1, a user indicated a series of screen locations in a display at which the shopper appeared in the video, and the series of screen locations were translated to store map coordinates.

The step of receiving the user input via input devices, such as a pointing device or keyboard, makes Sorensen 1 inefficient for handling a large amount of video data in a large shopping environment with a relatively complicated store layout, especially over a long period of time. The manual input by a human operator/user cannot efficiently track all of the shoppers in such cases, partially due to the possibility of human errors caused by tiredness and boredom. The manual input approach is also much less scalable as the number of shopping environments to handle for the behavior analysis increases. Therefore, an automated behavior analysis approach is needed for segmenting a large amount of video data for people in a physical space.

Although U.S. Pat. No. 7,006,982, (hereinafter Sorensen 2) disclosed a usage of a tracking device and store sensors in a plurality of tracking systems primarily based on the wireless technology, such as the RFID, Sorensen 2 is clearly foreign to the concept of applying computer vision based tracking algorithms to the field of understanding customers' shopping behaviors and movements. In Sorensen 2, each transmitter was typically attached to a hand-held or push-type cart. Therefore, Sorensen 2 cannot distinguish the behaviors of multiple shoppers using one cart from the behavior of a single shopper also using one cart. Although Sorensen 2 disclosed that the transmitter may be attached directly to a shopper, via a clip or other form of customer surrogate in order to correctly track the shopper in the case when the person is shopping without a cart, this will not be practical due to the additionally introduced cumbersome step to the shopper, not to mention the inefficiency of managing the transmitter for each individual shopper.

Sorensen 2 cannot efficiently provide the exact path of a shopper since it is based on creating a computer simulated field of view for each shopper based on the direction of travel. Also, the shopping behavior cannot be deciphered accurately as it is again based on determining the products that lie within the simulated field of view of the shoppers, and could result in incorrect judgments. On the contrary, the proprietary computer vision based technology in the present invention can automatically track people and their behaviors at a detailed interaction level in a physical space without using any simulation or approximation techniques, thus providing efficient behavior analysis information.

With regard to the temporal behavior of customers, U.S. Pat. Appl. Pub. No. 2003/0002712 of Steenburgh, et al. (hereinafter Steenburgh) disclosed a relevant prior art. Steenburgh disclosed a method for measuring dwell time of an object, particularly a customer in a retail store, which enters and exits an environment, by tracking the object and matching the entry signature of the object to the exit signature of the object, in order to find out how long people spend in retail stores. The method in Steenburgh can be used as one of the many methods to measure the dwell time of people in a physical space as one of the segmentation criteria.

Event Detection Based on Behavior Analysis

Event can be used as a way to decide the segmentation of the people attached to the event in the segmentation criteria. There have been earlier attempts for event detection based on customers' behaviors in a video.

U.S. Pat. Appl. Pub. No. 2003/0058339 of Trajkovic, et al. (hereinafter Trajkovic) disclosed a method for detecting an event through repetitive patterns of human behavior. Trajkovic learned multi-dimensional feature data from the repetitive patterns of human behavior and computed a probability density function (PDF) from the data. Then, a method for the PDF analysis, such as Gaussian or clustering techniques, was used to identify the repetitive patterns of behavior and unusual behavior through the variance of the Gaussian distribution or cluster.

Although Trajkovic can model a repetitive behavior through the PDF analysis, Trajkovic are clearly foreign to the event detection for the aggregate of non-repetitive behaviors, such as the shopper traffic in a physical space. Trajkovic did not disclose the challenges in the event detection based on customers' behaviors in a video in a retail environment, such as the non-repetitive behaviors. Therefore, Trajkovic are clearly foreign to the challenges that can be found in a retail environment.

U.S. Pat. Appl. Pub. No. 2006/0053342 of Bazakos, et al. (hereinafter Bazakos) disclosed a method for unsupervised learning of events in a video. Bazakos disclosed a method of creating a feature vector of a related object in a video by grouping clusters of points together within a feature space and storing the feature vector in an event library. Then, the behavioral analysis engine in Bazakos determined whether an event had occurred by comparing features contained within a feature vector in a specific instance against the feature vectors in the event library. Bazakos are primarily related to surveillance, rather than event detection based on customers' behaviors in a video.

U.S. Pat. Appl. Pub. No. 2005/0286774 of Porikli disclosed a method for event detection in a video using approximate estimates of the aggregated affinity matrix and clustering and scoring of the matrix. Porikli constructed the affinity matrix based on a set of frame-based and object-based statistical features, such as trajectories, histograms, and Hidden Markov Models of feature speed, orientation, location, size, and aspect ratio, extracted from the video.

Other Application Areas

There have been earlier attempts for activity analysis in various other areas than understanding customers' shopping behaviors, such as the surveillance and security applications. The following prior arts are not restricted to the application area for understanding customers' shopping behaviors in a physical space, but they disclosed methods for object activity modeling and analysis for the human body, using a video, in general.

U.S. Pat. Appl. Pub. No. 2003/0053659 of Pavlidis, et al. (hereinafter Pavlidis) disclosed a method for moving object assessment, including an object path of one or more moving objects in a search area, using a plurality of imaging devices and segmentation by background subtraction. In Pavlidis, the term "object" included customers, and Pavlidis also included itinerary statistics of customers in a department store. However, Pavlidis was primarily related to monitoring a search area for surveillance.

U.S. Pat. Appl. Pub. No. 2004/0113933 of Guler disclosed a method for automatic detection of split and merge events from video streams in a surveillance environment. Guler considered split and merge behaviors as key common simple behavior components in order to analyze high level activities of interest in a surveillance application, which are also used to understand the relationships among multiple objects, not just individual behavior. Guler used adaptive background subtraction to detect the objects in a video scene, and the objects were tracked to identify the split and merge behaviors. To understand the split and merge behavior-based high level events, Guler used a Hidden Markov Model (HMM).

U.S. Pat. Appl. Pub. No. 2004/0120581 of Ozer, et al. (hereinafter Ozer) disclosed a method for identifying activity of customers for a marketing purpose or activity of objects in a surveillance area, by comparing the detected objects with the graphs from a database. Ozer tracked the movement of different object parts and combined them to high level activity semantics, using several Hidden Markov Models (HMMs) and a distance classifier.

U.S. Pat. No. 6,741,973 of Dove, et al. (hereinafter Dove) disclosed a model of generating customer behavior in a transaction environment. Although Dove disclosed video cameras in a real bank branch as a way to observe the human behavior, Dove are clearly foreign to the concept of automatic event detection based on the customers' behaviors on visual information of the customers in other types of physical space, such as the shopping path tracking and analysis in a retail environment, for the sake of segmenting the customers based on their behaviors.

Computer vision algorithms have been shown to be an effective means for detecting and tracking people. These algorithms also have been shown to be effective in analyzing the behavior of people in the view of the means for capturing images. This allows the possibility of connecting the visual information from a scene to the segmentation of the people based on the behavior analysis and predefined event detection based on the behavior.

Therefore, it is an objective of the present invention to provide a novel approach for segmenting the people based on their behaviors utilizing the information from the automatic behavior analysis and predefined event detection. Any reliable automatic behavior analysis in the prior art may be used for the predefined event detection that will trigger the segmentation of the people in the present invention. However, it is another objective of the present invention to provide a novel solution that solves the aforementioned problems found in the prior arts for the automatic event detection, such as the cumbersome attachment of devices to the customers, by automatically and unobtrusively analyzing the customers' behaviors without involving any hassle of requiring the customers to carry any cumbersome device.

Demographics Analysis

Computer vision algorithms have also been shown to be an effective means for analyzing the demographic information of people in the view of the means for capturing images. Thus, the present invention also utilizes the technological advantage to the segmentation of the people in another exemplary embodiment. There have been prior attempts for recognizing the demographic category of a person by processing the facial image using various approaches in the computer vision technologies, such as a machine learning approach.

U.S. Pat. No. 6,990,217 of Moghaddam, et al. (hereinafter Moghaddam) disclosed a method to employ Support Vector Machine to classify images of faces according to gender by training the images, including images of male and female faces; determining a plurality of support vectors from the training images for identifying a hyperplane for the gender decision; and reducing the resolution of the training images and the test image by sub-sampling before supplying the images to the Support Vector Machine.

U.S. Pat. Appl. Pub. No. 20030110038 of Sharma, et al. (hereinafter Sharma 20030110038) disclosed a computer software system for multi-modal human gender classification, comprising: a first-mode classifier classifying first-mode data pertaining to male and female subjects according to gender, and rendering a first-mode gender-decision for each male and female subject; a second-mode classifier classifying second-mode data pertaining to male and female subjects according to gender, and rendering a second-mode gender-decision for each male and female subject; and a fusion classifier integrating the individual gender decisions obtained from said first-mode classifier and said second-mode classifier, and outputting a joint gender decision for each of said male and female subjects.

Moghaddam and Sharma 20030110038, for demographics classification mentioned above, aim to classify a certain class of demographics profile, such as for gender only, based on the image signature of faces. U.S. Provisional Pat. No. 60/808, 283 of Sharma, et al. (hereinafter Sharma 60/808,283) is a much more comprehensive solution, where the automated system captures video frames, detects customer faces in the frames, tracks the faces individually, corrects the pose of the faces, and finally classifies the demographics profiles of the customers—both of the gender and the ethnicity. In Sharma 60/808,283, the face tracking algorithm has been designed and tuned to improve the classification accuracy; the facial geometry correction step improves both the tracking and the individual face classification accuracy, and the tracking further improves the accuracy of the classification of gender and ethnicity over the course of visibly tracked faces by combining the individual face classification scores.

Therefore, it is another objective of the present invention to segment the people in a physical space based on the demographic information of people in another exemplary embodiment. The invention automatically and unobtrusively analyzes the customers' demographic information without involving any hassle to customers or operators of feeding the information manually, utilizing the novel demographic analysis approaches in the prior arts.

The present invention utilizes the automatic behavior analysis and demographic analysis in the video stream to segment the people based on segmentation criteria. The segmentation data in the present invention can be used for various market analysis applications, such as measuring deeper insights for customers' shopping behavior analysis in a retail store, media effectiveness measurement, and traffic analysis.

The prior arts above are foreign to the concept of segmenting the people based on the segmentation criteria for their behaviors by tracking and analyzing the movement information of the people in a physical space, such as a retail store. The present invention discloses a novel usage of computer vision technologies for efficiently segmenting the people based on their behaviors in a physical space by tracking and analyzing the movement information of the customers in regards to the segmentation criteria.

SUMMARY

The present invention is a method and system for segmenting a plurality of persons in a physical space based on automatic video-based behavior analysis of the persons in a preferred embodiment.

The processes are based on a novel usage of a plurality of computer vision technologies to analyze the behavior of the persons from the plurality of input images. It is an objective of the present invention to efficiently handle complex human behavior from video sources utilizing a plurality of computer vision technologies, such as person detection and tracking, in a preferred embodiment.

The present invention captures a plurality of input images of the persons in the physical space by a plurality of means for capturing images. Then, the present invention processes the plurality of input images in order to analyze the behavior of the persons, such as shopping behavior. The present invention segments the persons by applying segmentation criteria to the output of the video-based behavior analysis.

The behavior analysis can comprise a path analysis as one of the characterization methods. The present invention collects a plurality of trip information for each tracked person in the plurality of persons during a predefined window of time. Based on the trip information, the path analysis can distinguish between deliberate shoppers vs. lookers, and it can also be used to understand the intent of the plurality of persons who pass through the physical space based on the segmentation of the people.

The present invention efficiently handles the joining of the plurality of tracks across the multiple fields of view of the plurality of means for capturing images, accounting for splits and merges, and finds the information for the trip of the person based on the processed results from the plurality of tracks.

Utilization of the dwell time of the people in a specific location of the physical space can be used as one of the exemplary criteria for defining the targeted behavior and deciding in which segmentation group the relevant people belong.

In addition to the automatic video-based behavior analysis, the present invention can also utilize other types of visual characterization, such as demographic analysis, to segment the plurality of persons in another exemplary embodiment. In this exemplary embodiment, the present invention processes a video-based demographic analysis of each person in the plurality of persons in a plurality of input images, and segments the plurality of persons by applying segmentation criteria to the output of the demographic analysis of the plurality of persons.

The present invention can provide demographic segmentation of the physical space shoppers by gender and age group. In this exemplary embodiment, the shopping behavior of each demographic group can be analyzed to obtain segment-specific insights. Understanding segment-based shopper behavior for a specific physical space can help to develop effective customer-centric strategies to increase the basket size and loyalty of highest-opportunity segments.

The present invention can further utilize additional input sources, such as sales data, to segment the plurality of persons in another exemplary embodiment. In this exemplary embodiment, the present invention receives additional input in regards to the plurality of persons, and segments the plurality of persons by applying segmentation criteria to the additional input.

In an exemplary embodiment, the present invention can construct the segmentation criteria based on a set of predefined rules. The present invention can further construct the segmentation criteria based on a combination of a set of predefined rules, in which the population in the physical space can be divided into subpopulations by the combination of rules. The present invention can further define domain-specific criteria for the segmentation criteria.

The present invention can further apply different segmentation criteria per each segmentation group, so that the application of different segmentation criteria per each segmentation group allows the decision maker in the physical space to have a deeper understanding for each segmentation group.

Based on the criteria, the present invention assigns a label to each person in the plurality of persons during a predefined window of time at the segmentation process. The segmentation can also be processed by different time of day.

In another exemplary embodiment, the present invention can utilize a rule application logic module for applying the segmentation criteria to the behavior analysis data. The logic module enables dynamic rule application, where the segmentation can be adjusted in a much easier and structured way based on the rules.

The segmentation steps in the present invention can be applied to a plurality of physical spaces in a network of the physical spaces. In the network of the physical spaces, the present invention can differentiate the levels of segmentation in the network, in which a first set of segmentation criteria are applied throughout the network and a second set of segmentation criteria are applied to a predefined subset of the network of the physical spaces to serve specific needs of the predefined subset.

The physical space may be a retail space, and the persons may be customers in the retail space in the description of the invention. However, although the disclosed method may be described in the context of a retail space, the present invention can be applied to any physical space that has a restricted boundary, and the application area of the present invention is not limited to the retail space.

In regards to retail space application, the present invention can provide an unprecedented opportunity for manufacturers and retailers to analyze and optimize the performance of the business establishment in the retail space, using automated tools for behavior and segmentation analysis of the customers in the retail space. Most manufacturers can tell how their business establishment is performing based on point-of-sale data, but they do not have a clear understanding of the segmentation of the shoppers in the retail space. The solution in the present invention is based on proprietary technology that automatically measures shopper behavior and segmentation of them in a retail space. The solution leverages the strengths of the technologies in the present invention and processes to deliver a new level of access to the behaviors and characteristics of persons.

In regards to this application domain, the present invention helps to understand the influence of causal factors, like assortment, promotions, displays and local competition, in regards to shopper segmentation. It also provides an in-depth understanding of who the shoppers are in association with what they are buying or not buying, and how they are buying based on the segmentation groups. Such in-depth understanding of shopper behavior in regards to the segmentation groups will uncover hidden opportunities to grow the business establishment in the retail space.

It is a further objective of the present invention to extract analytic and statistical data from the segmentation. The present invention can represent the output of the segmentation as layers of information, maps, tables, or pie charts.

The automated solution provides customers with fact-based insights to improve the overall performance of the physical space. Shopper segmentation analysis will offer insights about who the shoppers are for a particular physical space. A clear understanding of shopper segments and their purchase behavior for a physical space will enable manufacturers and retailers to develop successful customer-centric strategies that improve basket size and loyalty.

Retailers and manufacturers utilize a variety of data sources to try to better understand their customers and potential customers. A large focus is on segmentation of these groups into subgroups based on different criteria. This segmentation allows for employment of more targeted approaches to reaching customers and potential customers or "customer-centric" marketing.

Traditionally, most segmentation has been done based on statistical data for demographics and transaction data collected at stores, which provides a good representation of buyer behavior. However, these segmentation approaches can only provide so much ability to target, and the focus has shifted to grouping customers and consumers based on similarities that cut across demographics or purchase behavior. These groupings center on the mindset and behavior of consumers, but the ability to measure actual in-store behavior has been limited to small-sample manual observation and self-reported feedback from consumers themselves.

In the present invention, the ability to offer insights for shopper subgroups, as defined by their actual in-store behavior, represents a huge move forward in customer-centric approaches and strategies. It bolsters current targeting based on behavior patterns with reliable, statistically significant data. In addition, it will provide marketers with the ability to uncover new patterns and trends in behavior—in particular with respect to a specific product, brand category or store dynamic.

DRAWINGS

Figures

Figure 4:
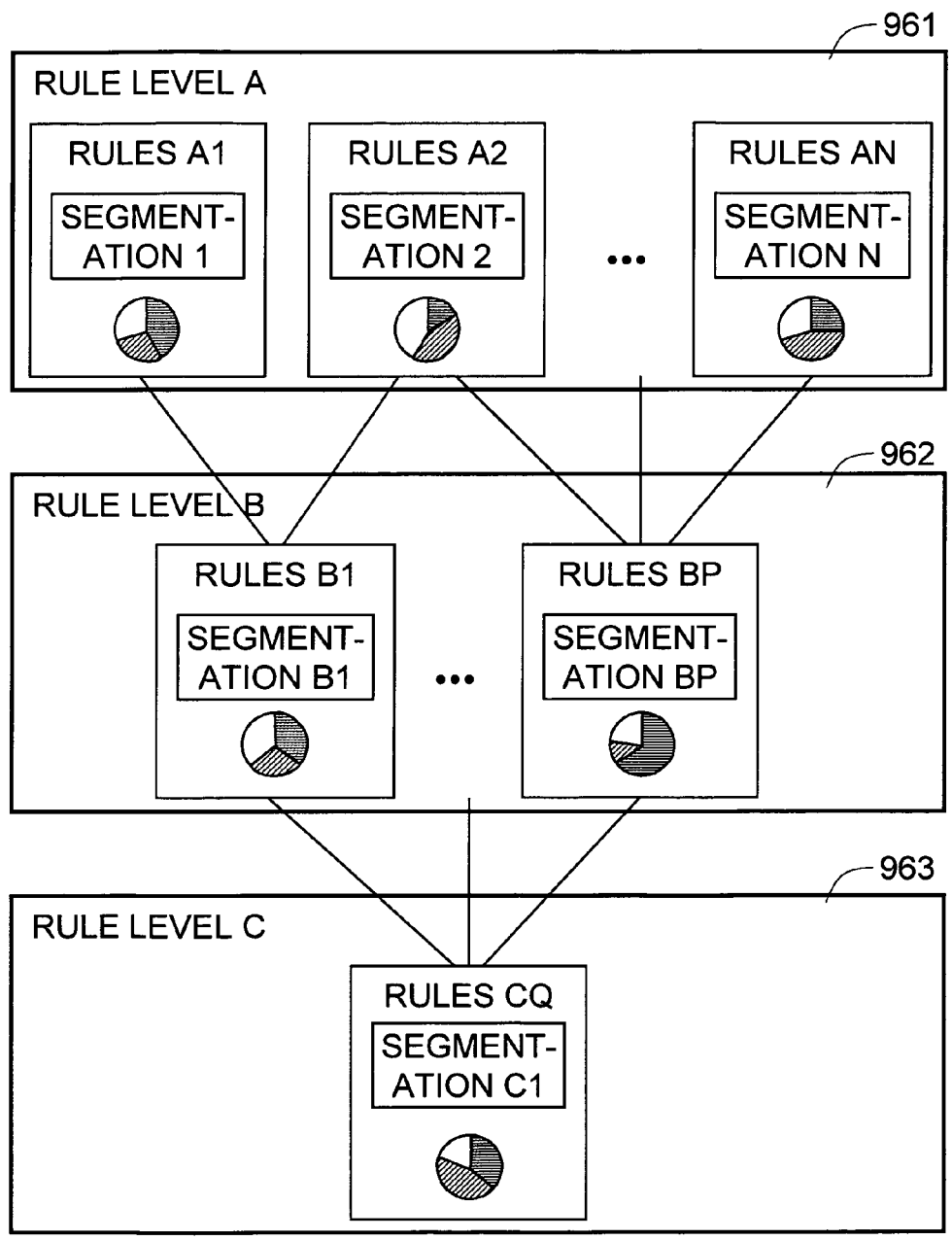

FIG. 4 shows another exemplary embodiment of the invention, where the present invention comprises application of a first set of a plurality of rules to a behavior analysis of a plurality of persons in a physical space at the initial population level and application of a second set of a plurality of rules and a third set of a plurality of rules to the segmentation, where the second set of a plurality of rules and the third set of a plurality of rules are composite rules from the previous levels.

Figure 5:
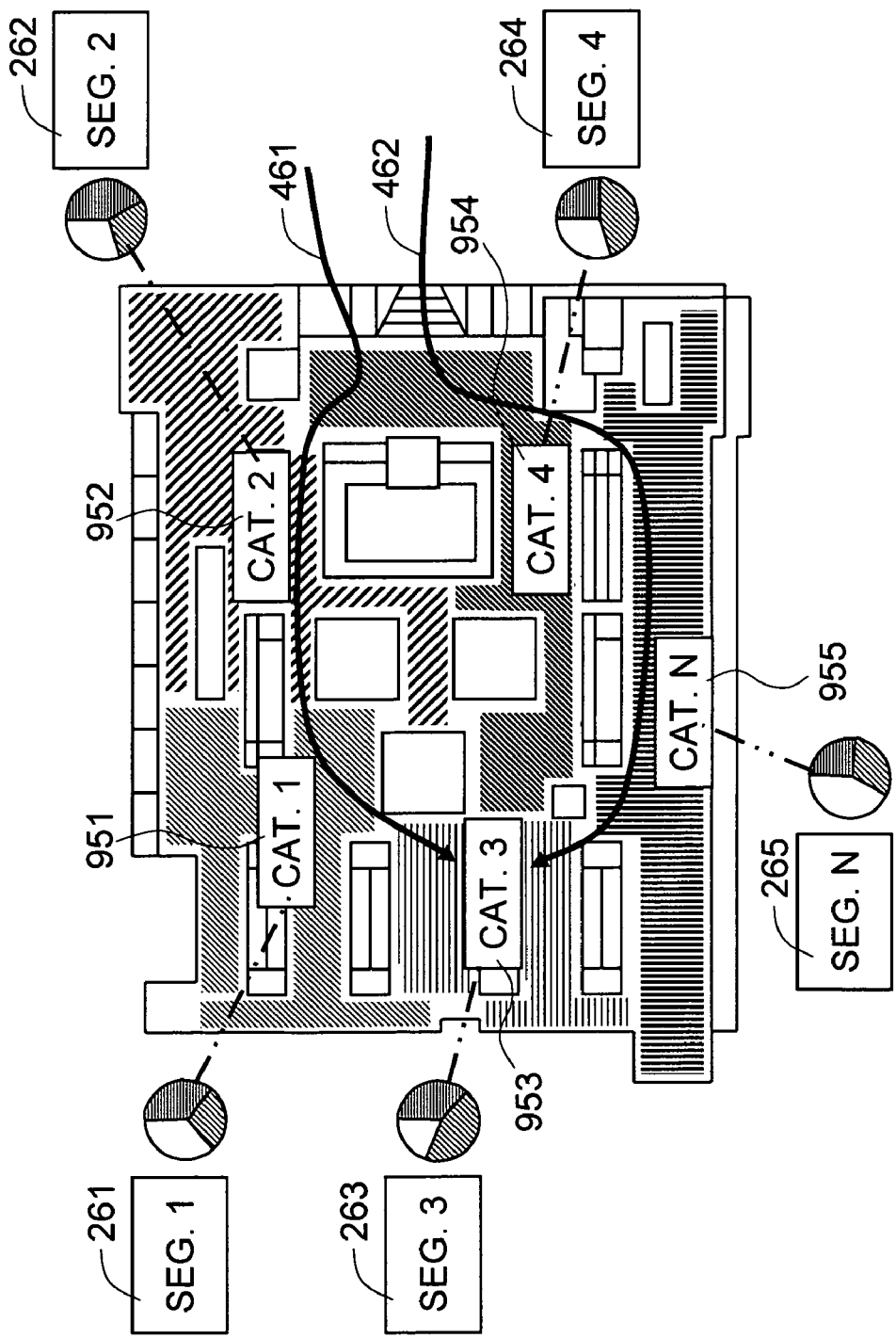

FIG. 5 shows segmentation of the people per each sub-space of a plurality of sub-spaces in a physical space.

Figure 6:
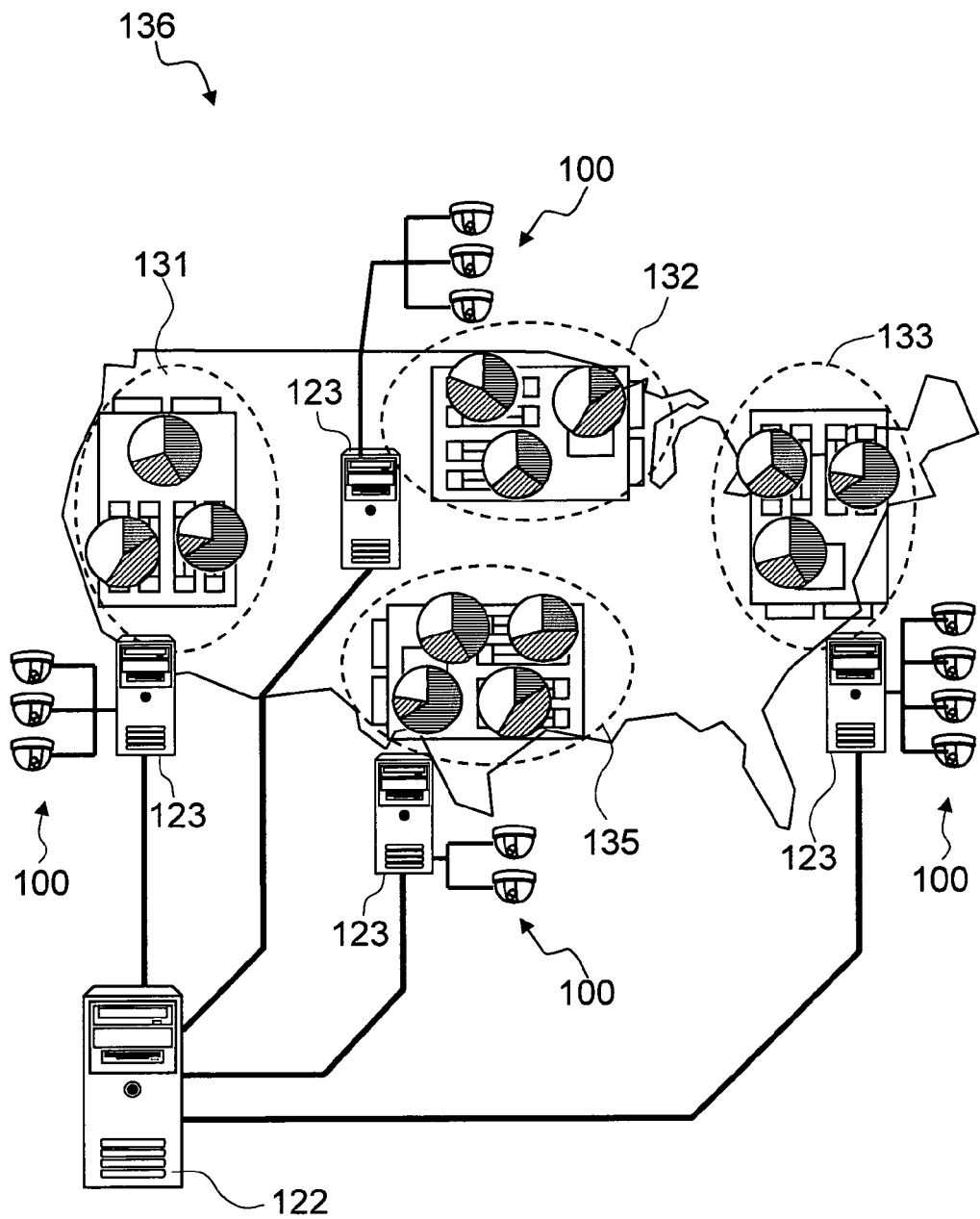

FIG. 6 shows an exemplary segmentation process that can be applied to a plurality of physical spaces in a network of the physical spaces.

Figure 7:
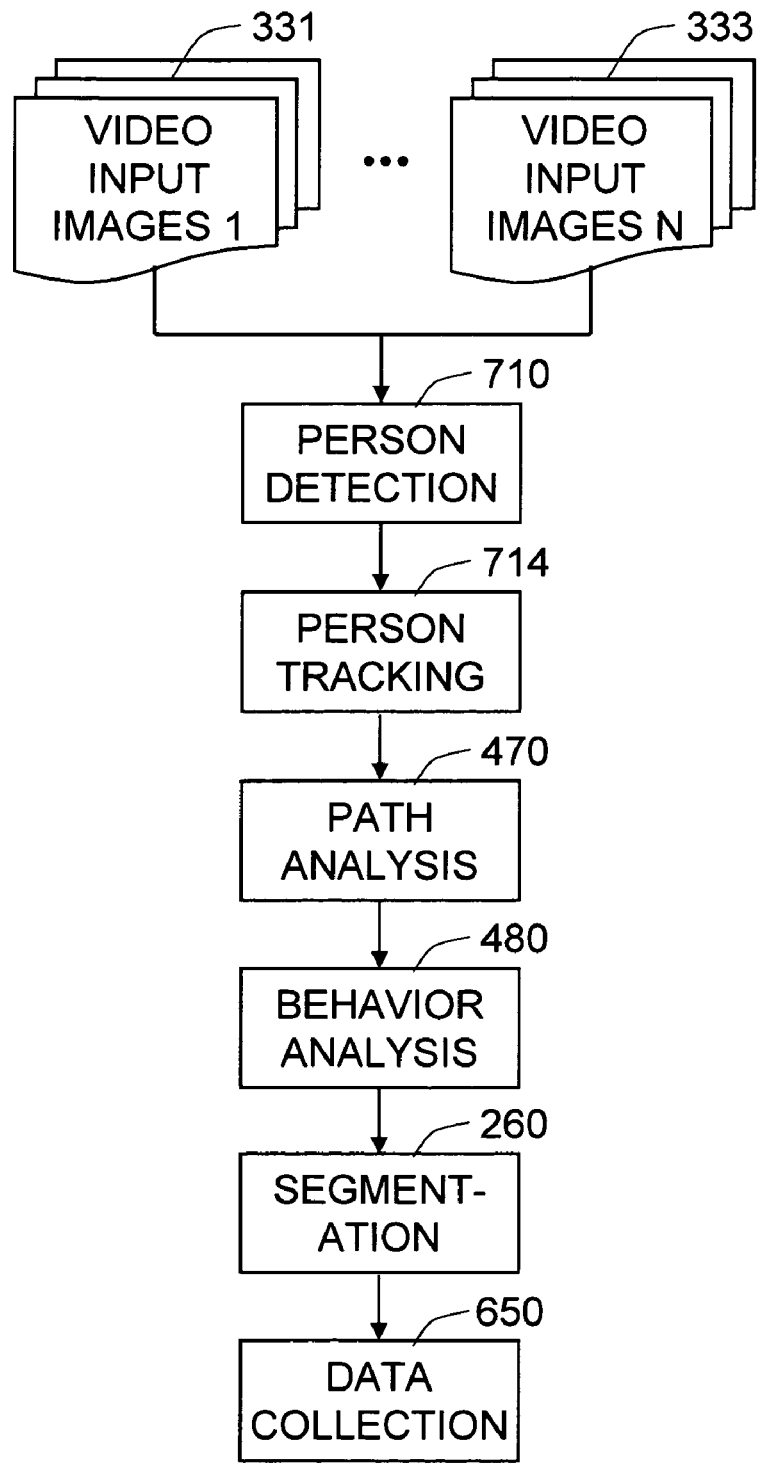

FIG. 7 shows overall processes of the segmentation based on automatic behavior analysis in an exemplary embodiment of the present invention.

Figure 8:
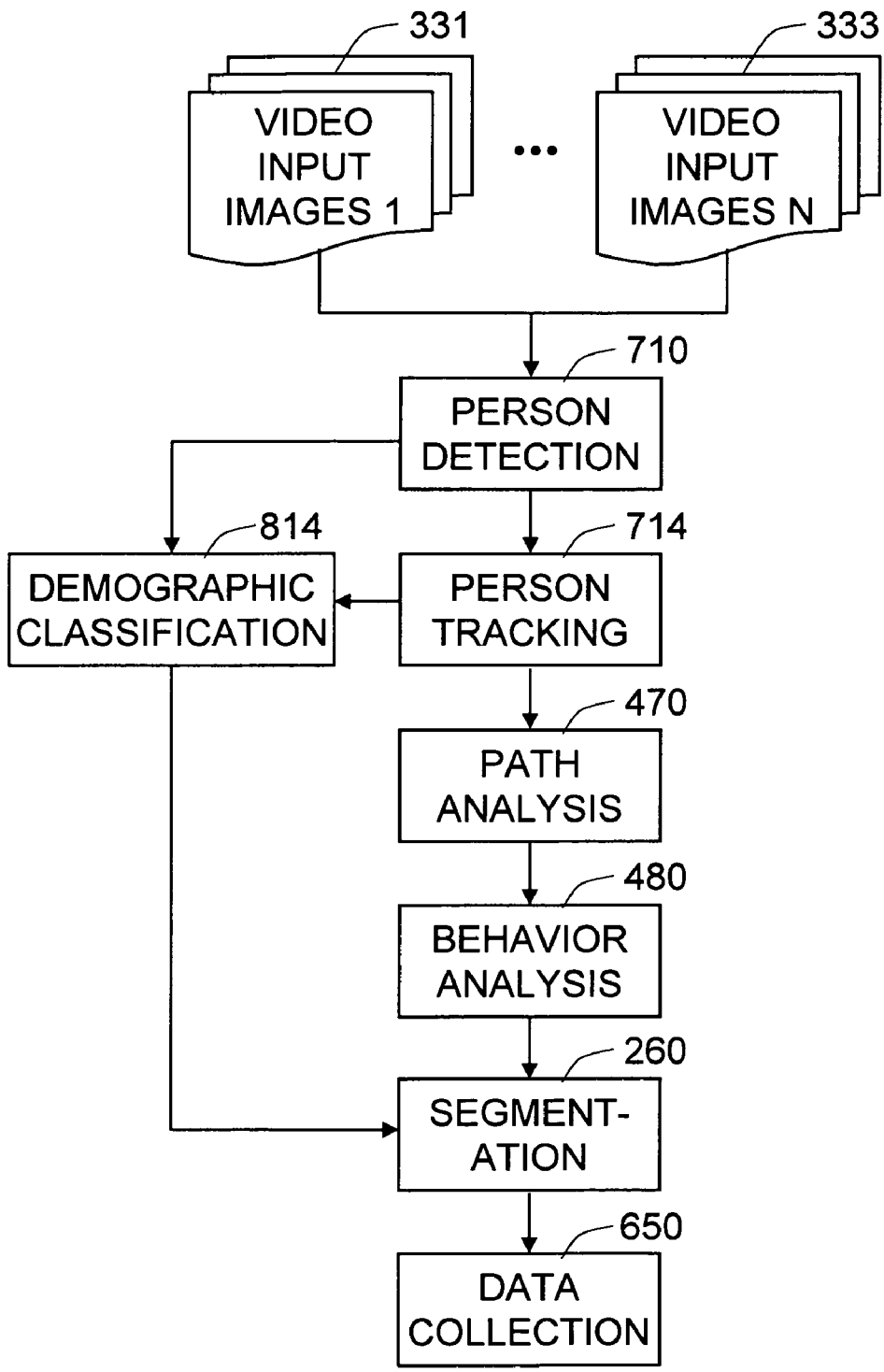

FIG. 8 shows overall processes of the segmentation based on automatic behavior analysis and demographic analysis in another exemplary embodiment of the present invention.

Figure 9:
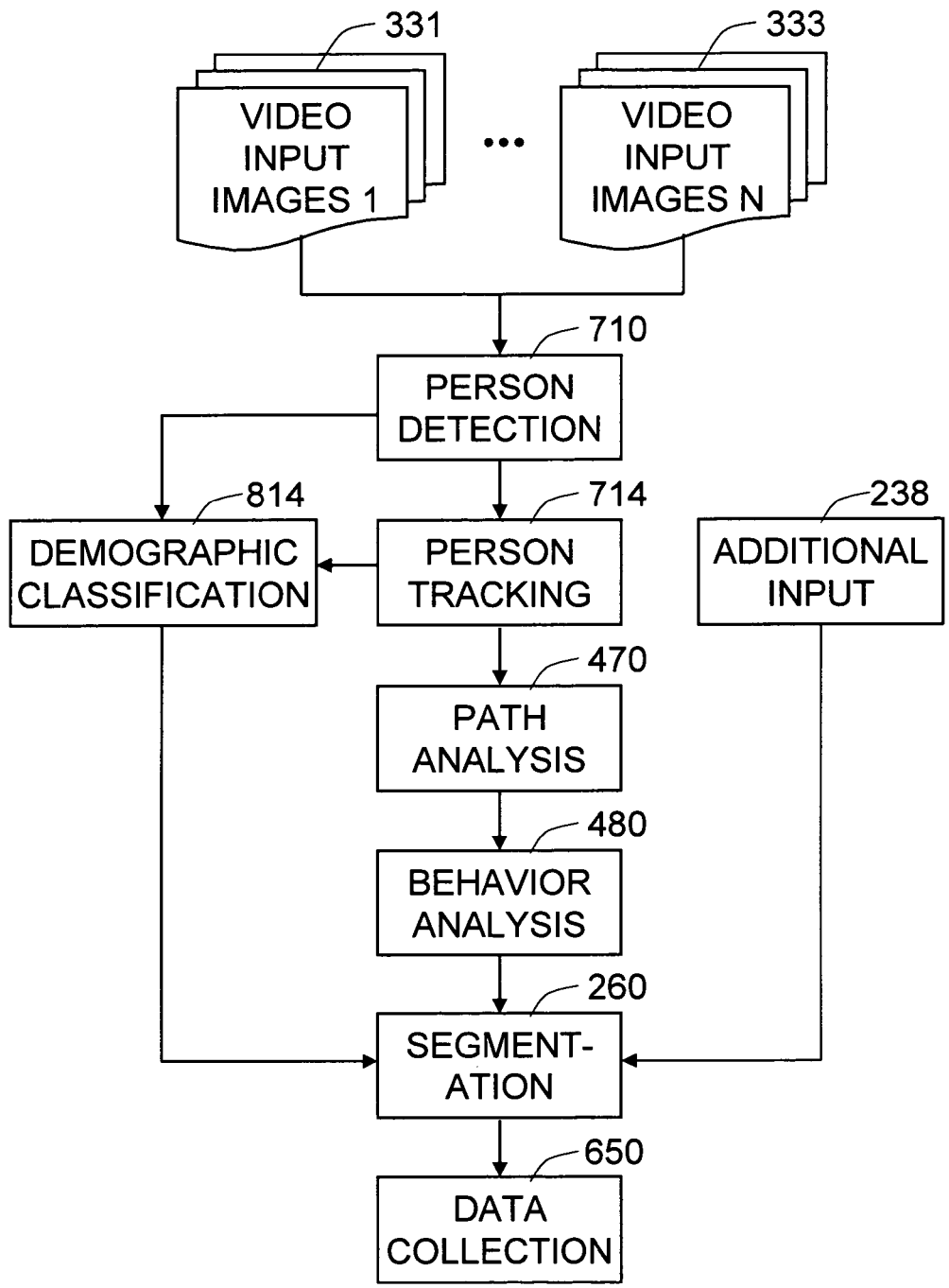

FIG. 9 shows overall processes of the segmentation utilizing additional input in addition to automatic behavior analysis and demographic analysis in another exemplary embodiment of the present invention.

Figure 10:
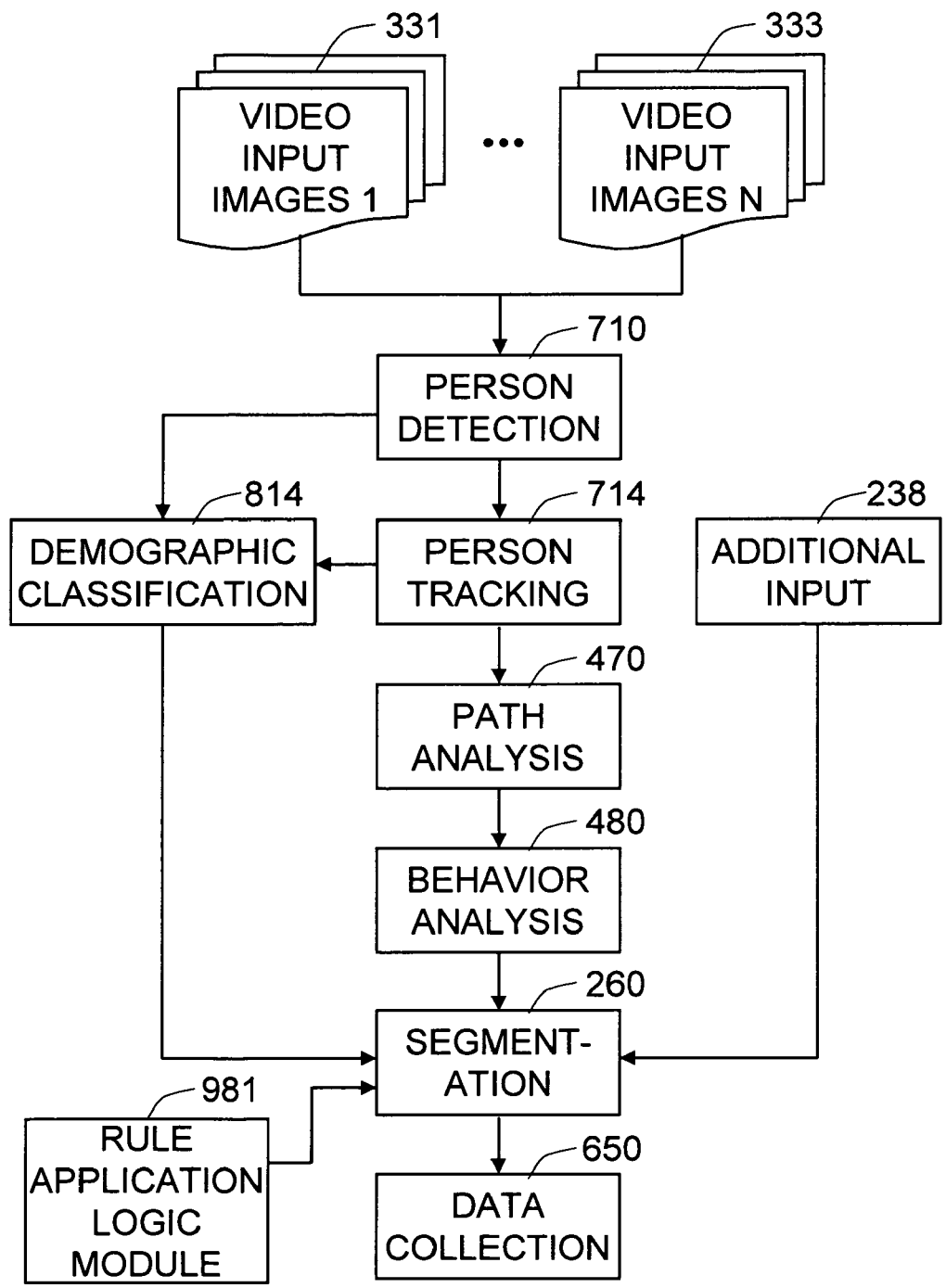

FIG. 10 shows overall processes of the segmentation, in which a rule application module is used for applying segmentation criteria at the segmentation process in another exemplary embodiment of the present invention.

Figure 11:
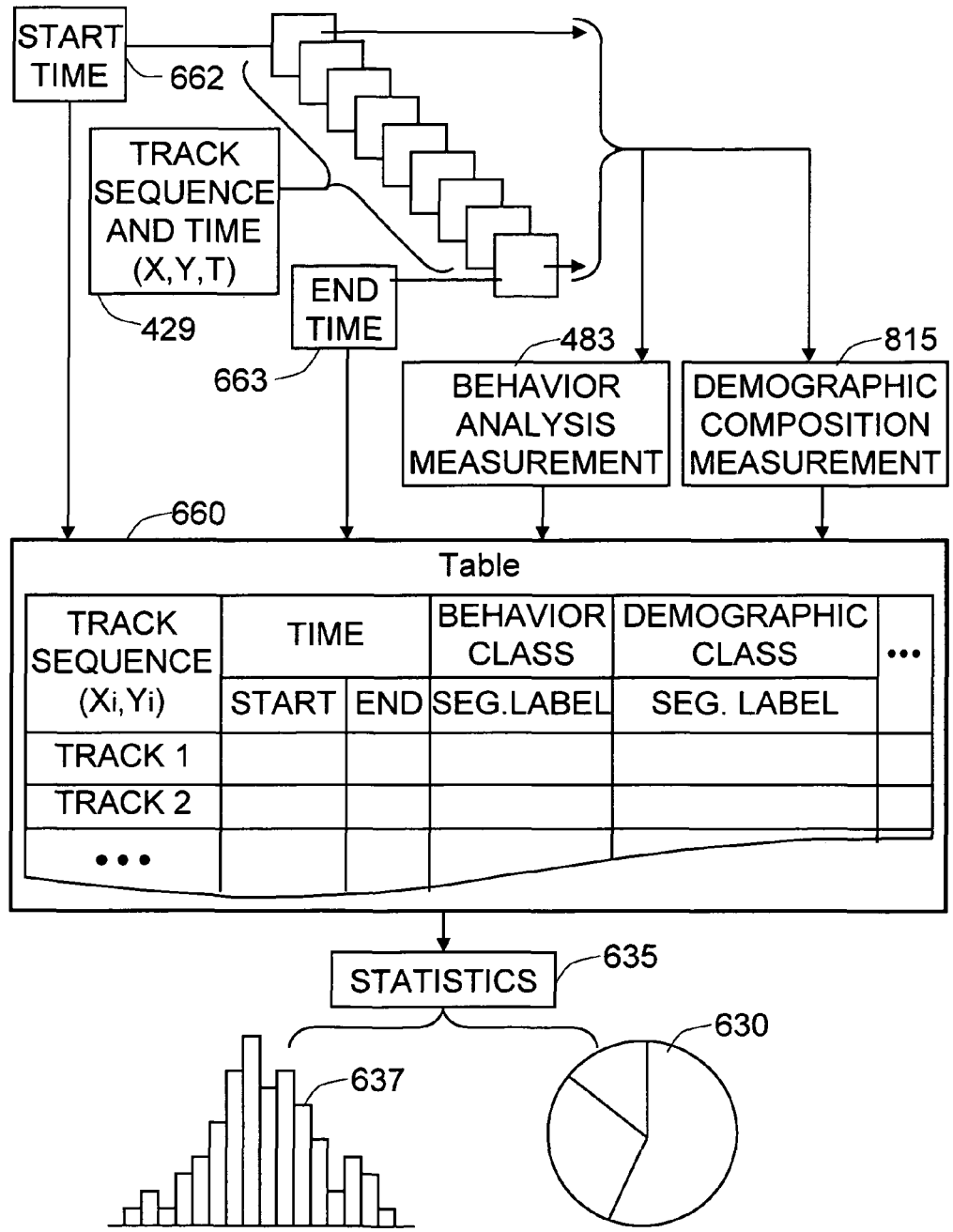

FIG. 11 shows an exemplary segmentation data collection and storage process in an exemplary embodiment of the present invention.

Figure 12:
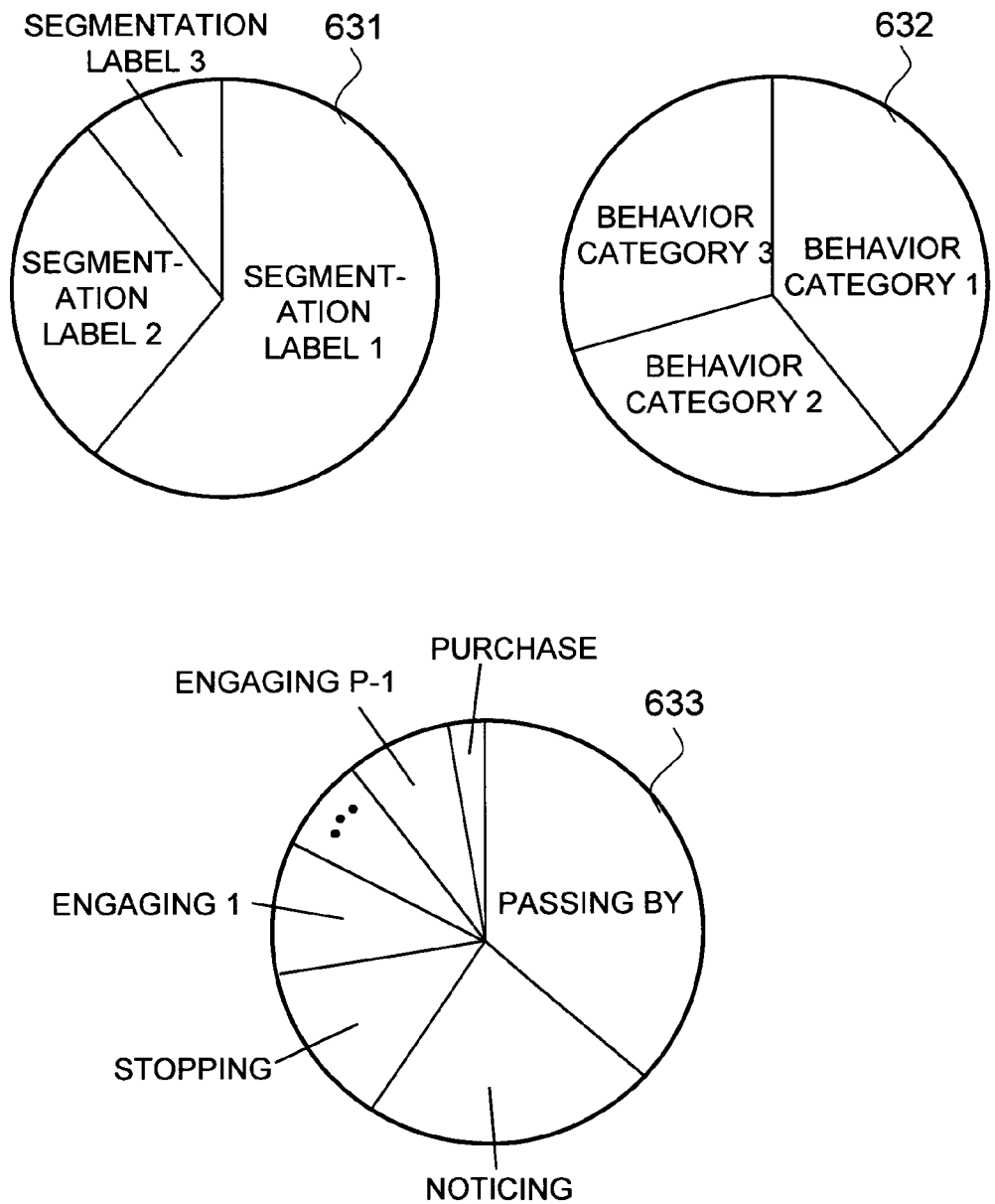

FIG. 12 shows exemplary pie charts of the exemplary segmentation, where the pie charts provide useful segmentation information to the decision maker, who owns an embodiment of the present invention, in a physical space.

DETAILED DESCRIPTION OF THE INVENTION

Figure 1:
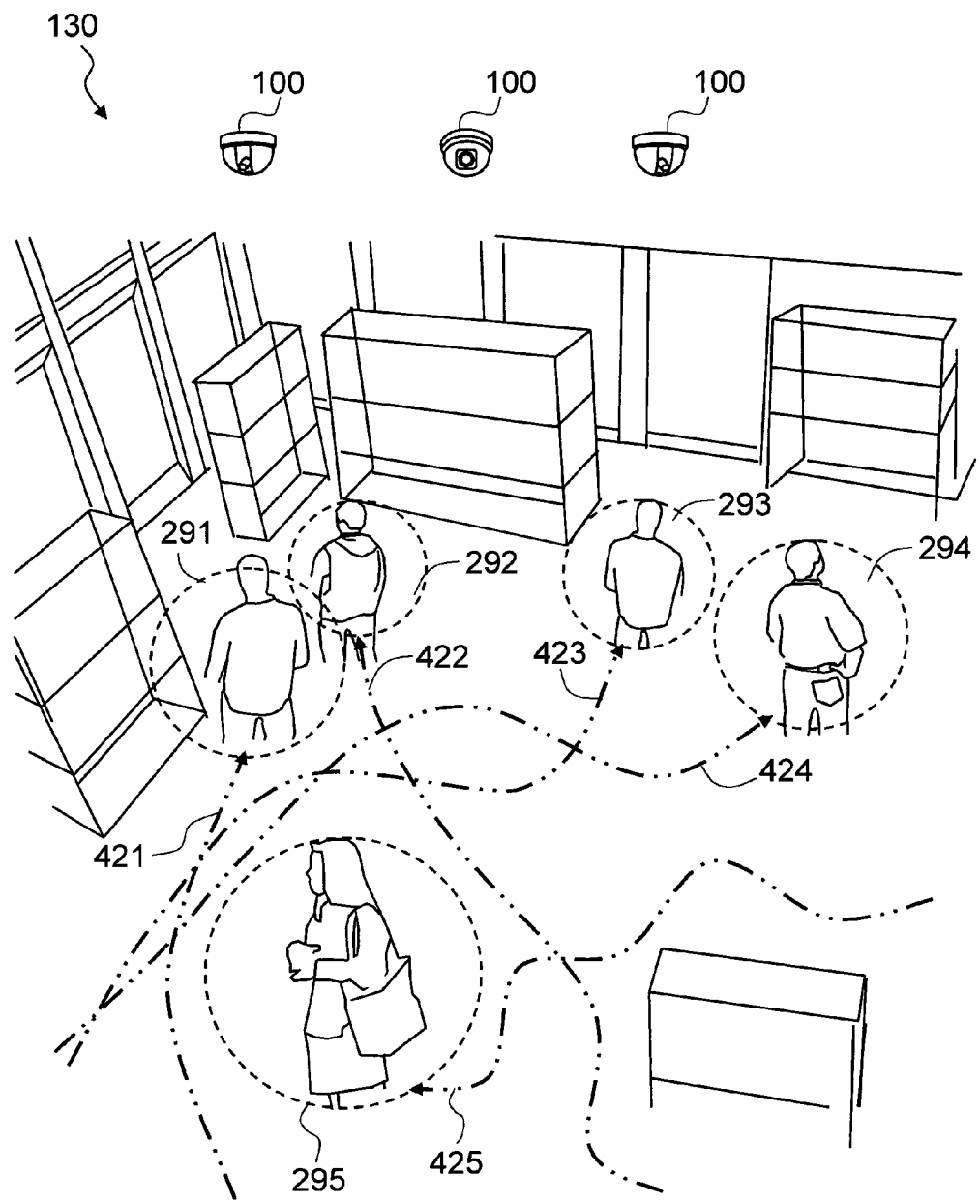
FIG. 1 is an overview of a preferred embodiment of the invention, where the present invention segments a plurality of persons based on the behavior analysis in a physical space.

FIG. 1 is an overview of a preferred embodiment of the invention, where the present invention segments a plurality of persons based on the automatic video-based behavior analysis in a physical space.

A Preferred Embodiment

The processes are based on a novel usage of a plurality of computer vision technologies to analyze the behavior of the persons from the plurality of input images. It is an objective of the present invention to efficiently handle complex human behavior from video sources utilizing a plurality of computer vision technologies, such as person detection and tracking, in a preferred embodiment.

As shown in FIG. 1, the present invention captures a plurality of input images of the persons in the physical space 130 by a plurality of means for capturing images 100. Then, the present invention processes the plurality of input images in order to track and analyze the behavior of the persons, such as shopping behavior. The present invention segments each of the persons by applying segmentation criteria to the output of the video-based behavior analysis and assigning segmentation label to each of the persons according to the segmentation. For example, in the exemplary embodiment shown in FIG. 1, the present invention processes segmentation and assigns "segmentation label 1" 291, "segmentation label 2" 292, "segmentation label 3" 293, "segmentation label 4" 294, and "segmentation label N" 295 for "track 1" 421, "track 2" 422, "track 3" 423, "track 4" 424, and "track N" 425, respectively, of the associated persons based on the segmentation criteria, at the specific physical space 130 during a window of time.

The behavior analysis can comprise a path analysis as one of the characterization methods. The present invention processes the plurality of input images in order to track each person in the plurality of persons in each field of view of the plurality of means for capturing images 100. Based on the tracking, the present invention processes the path analysis for each person in the plurality of persons.

The present invention collects a plurality of trip information for each tracked person in the plurality of persons during a predefined window of time. In the embodiment of the present invention, the trip information can comprise attributes for initial point and destination, coordinates of the person's position, temporal attributes, such as trip time and trip length, and average velocity for each of the plurality of trips.

Based on the trip information, the path analysis can be used to distinguish between deliberate shoppers vs. lookers, and it can also be used to understand the intent of the plurality of persons who pass through the physical space based on the segmentation of the people.

The present invention efficiently handles the joining of the plurality of tracks across the multiple fields of view of the plurality of means for capturing images 100, accounting for splits and merges, and finds the information for the trip of the person based on the processed results from the plurality of tracks.

Utilization of the dwell time of the people in a specific location of the physical space can be used as one of the exemplary criteria for defining the targeted behavior and deciding in which segmentation group the relevant people belong. Examples of the temporal targeted behavior can comprise passerby behavior and engaged shopper behavior, based on the dwell time measurement and comparison against predefined thresholds.

Other examples of the output of the video-based behavior analysis can comprise sequence of visits or a combination of visits to a predefined sub-space in the physical space by the plurality of persons.

Retail Space Application

The physical space may be a retail space, and the persons may be customers in the retail space in the description of the invention. However, although the disclosed method may be described in the context of a retail space, the present invention can be applied to any physical space that has a restricted boundary, and the application area of the present invention is not limited to the retail space.

In regards to retail space application, the present invention can provide an unprecedented opportunity for manufacturers and retailers to analyze and optimize the performance of the business establishment in the retail space, using automated tools for behavior and segmentation analysis of the customers in the retail space. Most manufacturers can tell how their business establishment is performing based on point-of-sale data, but they do not have a clear understanding of the segmentation of the shoppers in the retail space. The solution in the present invention is based on proprietary technology that automatically measures shopper behavior and segmentation of them in a retail space. The solution leverages the strengths of the technologies in the present invention and processes to deliver a new level of access to the behaviors and characteristics of persons.

In regards to this application domain, the present invention helps to understand the influence of causal factors, like assortment, promotions, displays and local competition, in regards to shopper segmentation. It also provides an in-depth understanding of who the shoppers are in association with what they are buying or not buying, and how they are buying based on the segmentation groups. Such in-depth understanding of shopper behavior in regards to the segmentation groups will uncover hidden opportunities to grow the business establishment in the retail space.

Overall Usefulness of the Present Invention

The automated solution provides customers with fact-based insights to improve the overall performance of the physical space. Shopper segmentation analysis will offer insights about who the shoppers are for a particular physical space. A clear understanding of shopper segments and their purchase behavior for a physical space will enable manufacturers and retailers to develop successful customer-centric strategies that improve basket size and loyalty.

The automated behavior analysis and segmentation technology in the present invention can help manufacturers and retailers to:

- improve physical space performance based on a deep understanding of physical space level behaviors and segmentation of the people,
- design effective retail programs by understanding market-level shopper profiles and preferences,
- develop micro-marketing strategies that appeal to local demographic groups resulting in increased loyalty to the store and brand,
- implement efficient product assortment strategies that are complete, profitable and satisfy the customer needs based on the segmentation, and
- enable efficient use of space in the store, resulting in an improved shopping environment, higher profits, and less frequent out-of-stocks.

Retailers and manufacturers utilize a variety of data sources to try to better understand their customers and potential customers. A large focus is on segmentation of these groups into subgroups based on different criteria. This segmentation allows for employment of more targeted approaches to reaching customers and potential customers or "customer-centric" marketing.

Traditionally, most segmentation has been done based on statistical data for demographics and transaction data collected at stores, which provides a good representation of buyer behavior. However, these segmentation approaches can only provide so much ability to target, and the focus has shifted to grouping customers and consumers based on similarities that cut across demographics or purchase behavior. These groupings center on the mindset and behavior of consumers, but the ability to measure actual in-store behavior has been limited to small-sample manual observation and self-reported feedback from consumers themselves.

In the present invention, the ability to offer insights for shopper subgroups, as defined by their actual in-store behavior, represents a huge move forward in customer-centric approaches and strategies. It bolsters current targeting based on behavior patterns with reliable, statistically significant data. In addition, it will provide marketers with the ability to uncover new patterns and trends in behavior—in particular with respect to a specific product, brand category or store dynamic.

Figure 2:
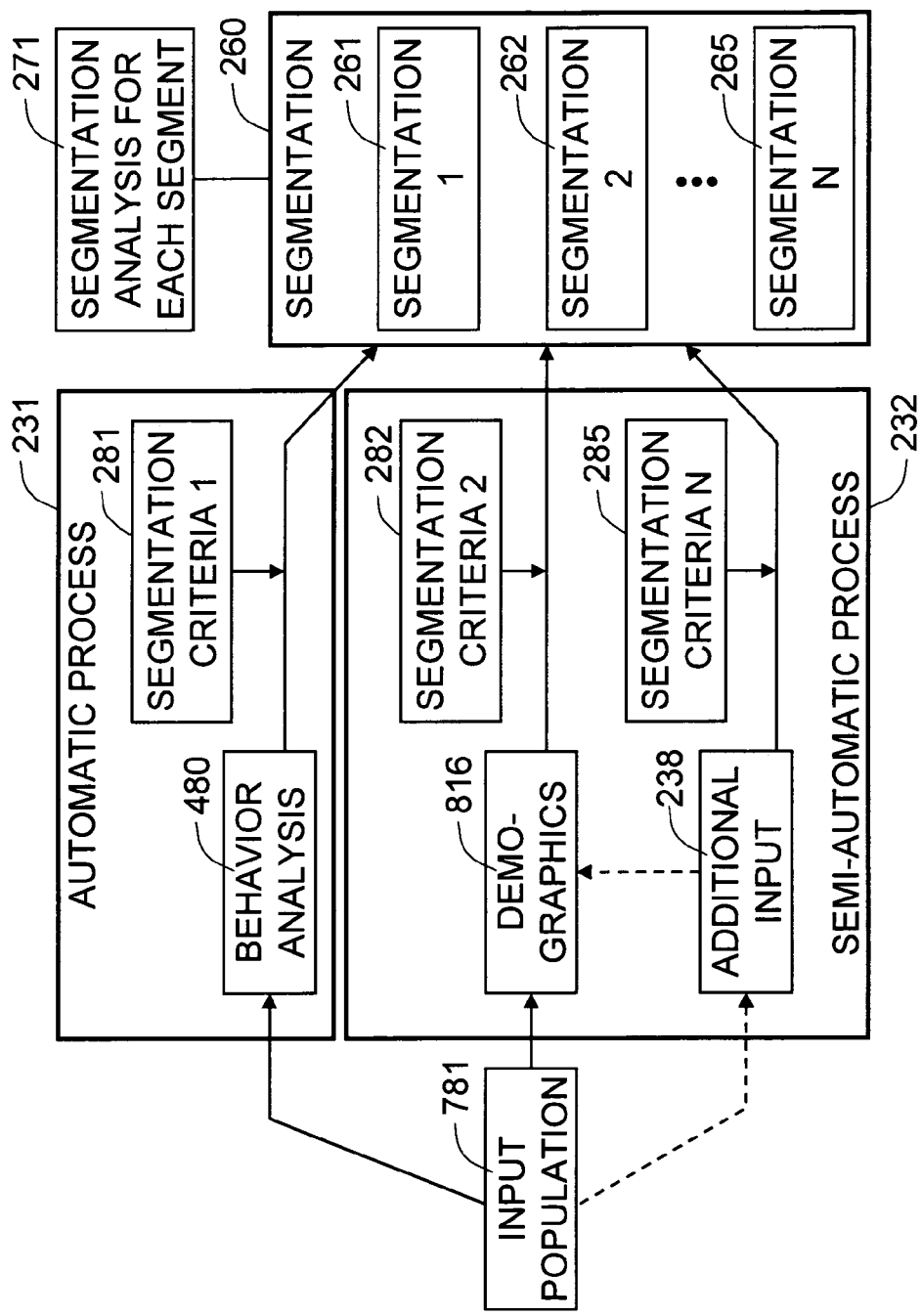
FIG. 2 shows different types of exemplary embodiments of the invention, where the present invention can comprise a utilization of the demographics and additional input to segment a plurality of persons in a physical space.

FIG. 2 shows different types of exemplary embodiments of the invention, where the present invention can comprise a utilization of the demographics and additional input to segment a plurality of persons in a physical space.

In a preferred embodiment, the present invention segments a plurality of persons in a physical space based on automatic video-based behavior analysis of the persons. However, the present invention can also utilize other types of visual characterization, such as demographic analysis, in addition to the behavioral characteristics or independently, to segment the plurality of persons in another exemplary embodiment.

In the exemplary embodiment shown in FIG. 2, the present invention processes a plurality of input images from the input population 781 to measure the video-based demographics 816 of each person in the plurality of persons, and segments the plurality of persons by applying segmentation criteria, such as "segmentation criteria 2" 282 to the output of the demographic analysis of the plurality of persons.

The present invention can provide demographic segmentation of the physical space shoppers by gender and age group. In this exemplary embodiment, the shopping behavior of each demographic group can be analyzed to obtain segment-specific insights. Understanding segment-based shopper behavior for a specific physical space can help to develop effective customer-centric strategies to increase the basket size and loyalty of highest-opportunity segments.

In the exemplary embodiment shown in FIG. 2, the present invention can further utilize additional input 238 sources, such as sales data, to segment the plurality of persons. In this exemplary embodiment, the present invention receives additional input 238 in regards to the plurality of persons, and segments the plurality of persons by applying segmentation criteria, such as "segmentation criteria N" 285, to the additional input 238. Examples of the additional input 238 can comprise transaction data by the plurality of persons. Unlike the automatic behavior analysis and demographic analysis, the additional input may be fed into the present invention manually by an operator, such as a sales representative, in the physical space. Thus, this type of embodiment has a semi-automatic process 232 in the system.

Segmentation Criteria

In an exemplary embodiment, the present invention applies pre-constructed segmentation criteria to the output of the behavior analysis, demographics by the demographic classification, and additional input. In the exemplary embodiment shown in FIG. 2, "segmentation criteria 1" 281, "segmentation criteria 2" 282, and "segmentation criteria N" 285 are used to process the segmentation 260, i.e. "segmentation 1" 261, "segmentation 2" 262, and "segmentation N" 265.

The segmentation criteria can be based on a set of pre-defined rules, in which the set of predefined rules will eventually serve as a set of segmentation rules. The segmentation criteria can also be constructed based on a learning algorithm of the input training population in prior, such as unsupervised clustering approach based on similarity measure of the behavioral features, or example based behavior recognition algorithm. The present invention can further construct the segmentation criteria based on a combination of a set of the initially predefined rules, in which the population in the physical space can be divided into subpopulations by the combination of rules.

The present invention can further define domain-specific criteria for the segmentation criteria. Examples of the domain-specific criteria can comprise criteria that are constructed based on retail-specific rules.

The present invention can further apply different segmentation criteria per each segmentation group, so that the application of different segmentation criteria per each segmentation group allows the decision maker in the physical space to have deeper understanding for each segmentation group.

The composite rules, domain-specific criteria, and application of different segmentation criteria are a few of the methods that enable the system to process further segmentation analysis for each segment 271.

Based on the criteria, the present invention assigns a label to each person in the plurality of persons during a predefined window of time at the segmentation process. The segmentation can also be processed by different time of day.

Figure 3:
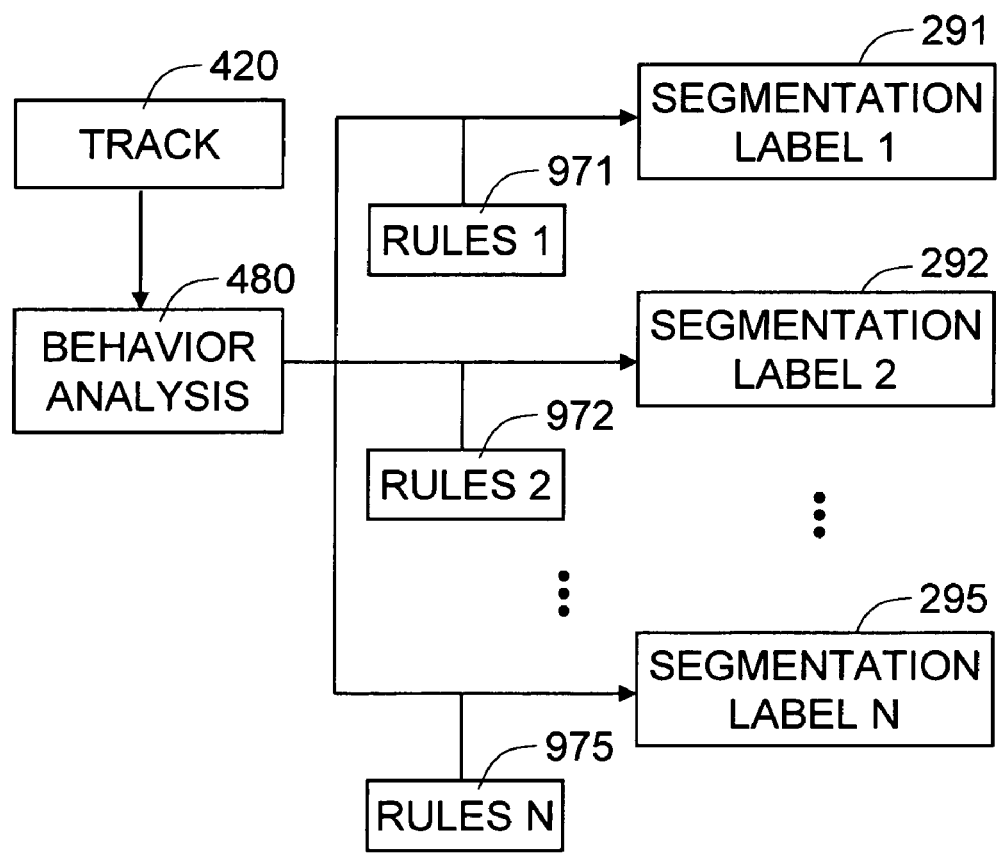
FIG. 3 shows another exemplary embodiment of the invention, where the present invention applies a plurality of rules to a behavior analysis, which can create a plurality of segmentation outputs.

FIG. 3 shows another exemplary embodiment of the invention, where the present invention applies a plurality of rules to a behavior analysis, which can create a plurality of segmentation outputs.

As discussed above, the present invention can further apply different segmentation criteria to the same tracking information of the people. The application of different segmentation criteria to the same tracking creates different segmentation output per each segmentation criteria, which could satisfy different goals of the segmentation per measured input population by the decision maker in the physical space.

In the exemplary embodiment shown in FIG. 3, the "rules 1" 971, "rules 2" 972, and "rules N" 975 can form different type of segmentation criteria and be applied to the behavior analysis 480 for a track 420, which eventually creates different segmentation output, thus assigning different segmentation labels for the track 420, "segmentation label 1" 291, "segmentation label 2" 292, and "segmentation label N" 295, respectively. As mentioned previously, this functionality of the present invention enables the owner of the particular embodiment to segment the input population according to various business goals and analyze the market audience in a more tuned way for the specific business goals.

FIG. 4 shows another exemplary embodiment of the invention, where the present invention comprises application of a first set of a plurality of rules to a behavior analysis of a plurality of persons in a physical space at the initial population level and application of a second set of a plurality of rules and a third set of a plurality of rules to the segmentation.

As shown in FIG. 4, the second set of a plurality of rules at the "rule level B" 962 can be constructed as the composite rules by combining a plurality of rules from the set of rules at the previous level, i.e. "rule level A" 961. Likewise, the third set of a plurality of rules at the "rule level C" 963 can be constructed as the composite rules from the set of rules at the previous level, i.e. "rule level B" 962.

The composite rules can be useful when the owner of the present invention wants to segment the target people based on more complex rules and have a finer understanding of them.

For example, the segmentation process using the first set of a plurality of rules can label the behaviors based on whether the people showed certain behavioral patterns, such as shopping activity for product A, product B, and product C. Then, the segmentation process using the composite rules by combining a plurality of rules from the previous level can further label the people for more complex behaviors, such as shopping activity for product A and product B or shopping activity for product A but not product C.

FIG. 5 shows segmentation of the people per each sub-space of a plurality of sub-spaces in a physical space.

The present invention can provide the overall segmentation data for the entire physical space by accumulating the segmentation labels for the people in the physical space. However, the present invention can also provide the segmentation data per sub-space in a physical space by accumulating the segmentation labels for the people only within the specific sub-space. As shown in FIG. 5, exemplary sub-spaces can comprise categories in the present invention. A category is defined as a logical entity for a group of products, a group of product types, space, areas in a store, display of a group of products, or department with similar relevance in the present invention.

In the exemplary embodiment in FIG. 5, the physical space comprises five exemplary categories, "category 1" 951, "category 2" 952, "category 3" 953, "category 4" 954, and "category N" 955, and each category has its own accumulated segmentation data, i.e. "segmentation 1" 261, "segmentation 2" 262, "segmentation 3" 263, "segmentation 4" 264, and "segmentation N" 265, respectively. The present invention produces the segmentation data for each category in the exemplary five categories by accumulating the segmentation labels for the people who traveled in each category during a predefined window of time. For example, the exemplary "path 1" 461 of a person contributes to the accumulated segmentation data creation for categories, "category 4" 954, "category 2" 952, "category 1" 951, and "category 3" 953, while the person passes through the physical space from one category to another category in that particular order. The physical boundary of each category can be predefined. Therefore, utilizing the coordinates, (Xi, Yi), of the tracking information in the path and the time, Ti, of travel, the behavior analysis of the person in a specific location at a certain moment can be matched to the relevant category and eventually contributes to the accumulated segmentation data creation for that specific category. Likewise, the exemplary "path 2" 462 of another person contributes to the accumulated segmentation data creation for categories, "category 4" 954, "category N" 955, and "category 3" 953, while the person passes through the physical space from one category to another category in that particular order.

As shown in the example, both paths, "path 1" 461 and "path 2" 462, contribute to the segmentation data for the "category 3" 953 and "category 4" 954. However, the "path 1" 461 does not contribute to the segmentation process and its output segmentation data for the "category N" 955 because any segmentation label based on the "path 1" 461 is not accumulated for the "category N" 955 during the predefined window of time, and the "path 2" 462 does not contribute to the segmentation process and its output segmentation data for the "category 1" 951 and "category 2" 952 because again any segmentation label based on the "path 2" 462 is not accumulated for the "category 1" 951 and "category 2" 952 during the predefined window of time.

The number and characteristics of the categories or sub-spaces can vary, depending on the circumstances and objectives in the physical space. In the case of a retail space, they vary depending on the business goal of the particular business establishment. This capability for adjusting the granularity of the segmentation in the present invention enables the owner of the system to have a finer level of segmentation data and understanding for the people.

Application to the Network of Physical Spaces

FIG. 6 shows an exemplary segmentation process that can be applied to a plurality of physical spaces in a network of the physical spaces.

The segmentation steps in the present invention can be applied to a plurality of physical spaces in a network of the physical spaces. An exemplary network of the physical spaces can comprise a large number of retail stores.

In the "network of the physical spaces" 136, such as the "physical space 1" 131, "physical space 2" 132, "physical space 3" 133, and "physical space n" 135, the present invention can differentiate the levels of segmentation in the network, in which a first set of segmentation criteria are applied throughout the network and a second set of segmentation criteria are applied to a predefined subset of the network of the physical spaces to serve specific needs of the predefined subset. An exemplary first set of segmentation criteria can typically comprise common segmentation criteria throughout the network, and the second set of segmentation criteria is typically different from the first set of segmentation criteria.

In the exemplary embodiment shown in FIG. 6, a "central server" 122 controls a plurality of vision processing units. The "vision processing unit (VPU)" 123 comprises a means for control and processing, means for video interface, and a plurality of means for capturing images 100. The VPU processes the segmentation of each physical space in coordination with the "central server" 122.

In the exemplary embodiment shown in FIG. 6, a plurality of means for capturing images 100 are connected to the means for video interface. The means for control and processing takes digitized video data from the means for video interface. The means for control and processing can have internal means for storing data or external means for storing data.

The means for capturing images 100 can comprise an analog camera, USB camera, or Firewire camera. The means for video interface, which can comprise a video frame grabber, USB interface, or Firewire interface, are typically included in the same enclosure as the means for control and processing. The means for control and processing can be a general-purpose personal computer, such as a Pentium 4 PC, or a dedicated hardware that can carry out the required computation. The means for control and processing, as well as the means for video interface, can be placed locally or remotely, as long as the connection to the means for capturing images 100 can be established. The internal means for storing data, such as internal hard disks, is placed within the same enclosure as the means for control and processing. The external means for storing data, such as a network storage driver or internal hard disks contained in a remote computer, can be placed locally or remotely, as long as a means for transferring data is available.

In an exemplary embodiment, a general-purpose USB webcam can serve as the means for capturing images 100. A Pentium 4 2.8 GHz PC having 1 GB memory can serve as a means for control and processing, where a generic USB interface included in the PC's motherboard can serve as a means for video interface. A generic IDE hard disk drive can serve as the internal means for storing data or the external means for storing data.

Sampling of a subset of the network of the physical spaces rather than segmenting all the physical spaces in the network of the physical spaces can be used, depending on the usage of the present invention.

FIG. 7 shows overall processes of the segmentation based on automatic behavior analysis in an exemplary embodiment of the present invention.

In the exemplary embodiment shown in FIG. 7, the present invention captures a plurality of input images, including "video input images 1" 331 and "video input images N" 333, of the persons in the physical space by a plurality of means for capturing images. Then, the present invention processes the plurality of input images for person detection 710 and person tracking 714. The person detection 710 and person tracking 714 is performed for each person in the plurality of persons in each field of view of the plurality of means for capturing images. Based on the tracking of the person, the present invention processes the path analysis 470 for each person in the plurality of persons, in which the present invention utilizes the coordinate sequence and temporal attributes from the tracking to create a trip information of the person. The present invention utilizes the trip information in the path analysis as one of the ways to process the behavior analysis 480 of the persons, such as shopping behavior. The present invention collects a plurality of trip information for each tracked person in the plurality of persons during a predefined window of time. The present invention segments 260 the plurality of persons by applying segmentation criteria to the output of the video-based behavior analysis and collects 650 the segmentation data during the predefined window of time.

In the embodiment of the present invention, the trip information can comprise attributes for initial point and destination, coordinates of the person's position, temporal attributes, such as trip time and trip length, and average velocity for each of the plurality of trips.

Based on the trip information, the path analysis can be used to distinguish between deliberate shoppers vs. lookers, and it can also be used to understand the intent of the plurality of persons who pass through the physical space, based on the segmentation of the people.

The present invention efficiently handles the joining of the plurality of tracks across the multiple fields of view of the plurality of means for capturing images, accounting for splits and merges, and finds the information for the trip of the person based on the processed results from the plurality of tracks.

Utilization of the dwell time of the people in a specific location of the physical space can be used as one of the exemplary criteria for defining the targeted behavior and deciding in which segmentation group the relevant people belong. Examples of the temporal targeted behavior can comprise passerby behavior and engaged shopper behavior, based on the dwell time measurement and comparison against predefined thresholds.

Other examples of the output of the video-based behavior analysis can comprise sequence of visits, a combination of visits to a predefined sub-space in the physical space by the plurality of persons, or certain pattern changes in the people's trip in regards to an adjacent group of other people in the physical space.

The present invention can utilize any reliable video-based tracking method for people in the prior art in regards to the behavior analysis.

U.S. Provisional Pat. No. 60/846,014 of Sharma, et al. (hereinafter Sharma 60/846,014) disclosed an exemplary process of video-based tracking and behavior analysis for a single customer or a group of customers using multiple means for capturing images, based on the spatial and temporal attributes of the person tracking.

FIG. 20 and FIG. 21 in Sharma 60/846,014 show exemplary spatio-temporal primitives for modeling human-object behavior and exemplary shopping interaction levels that are observed to produce the behavioral analysis in a physical space.

As described in Sharma 60/846,014, the behavior recognition can be achieved via spatio-temporal analysis of tracks, using geometry and pattern recognition techniques. The approach for defining and detecting spatio-temporal relations specific to the retail enterprise domain followed by a Bayesian Belief propagation approach to modeling primitive behaviors specific to the retail domain, as an exemplary site of a media network in Sharma 60/846,014, can also be applied to any physical space.

In Sharma 60/846,014, the exemplary primitive behaviors comprised categories of "customer moves towards object", "customer doesn't walk towards object", "customer velocity reduces", "customer velocity increases", "customer stands in front of object", and "customer walks away from object", and these primitive behaviors were combined to model predefined complex behaviors. Then the behaviors of the people were analyzed based on the model. Walkthrough history, the time spent in a certain area within a physical space, frequency pattern, relational pattern, and special event pattern can also be used as the exemplary attributes for the behavior analysis.

The exemplary shopping interaction levels in Sharma 60/846,014 can be regarded as an exemplary higher level of complex behaviors in a target physical space, including a retail space, which are observed to produce the behavioral analysis in the context of the present invention.

Sharma 60/846,014 defined the exemplary shopping interaction levels based on the spatio-temporal relations, which are "passing by", "noticing", "stopping", from "engaging 1" to "engaging P-1", and "purchase". They are labeled as "level 1" interaction, "level 2" interaction, "level 3" interaction, from "level 4" interaction to "level P-1" interaction, and "level p" interaction, respectively, where multiple engaging levels are also considered.

The shopping interaction level can be measured based on the temporal attribute of the person tracking for the customer in regards to the combination of the primitive behaviors. For example, if there is no change in velocity, the present invention can measure the person's interaction level as a passerby level at a particular category. If the stopping time $T_i$ is greater than a threshold, such as T1 seconds, then the present invention can measure the person's interaction level as a level 4 interaction. Likewise, the temporal attribute of the person tracking can match the time value to the corresponding interaction levels, based on the predefined threshold and rules.

Utilizing the exemplary method for behavior analysis based on the spatio-temporal primitives and model for the interaction levels, such as the shopping interaction levels in a retail space, based on the path analysis 470 of the people in a physical space, the present invention can segment 260 the plurality of people according to predefined segmentation criteria.

As mentioned previously, the segmentation criteria can also be constructed based on other types of exemplary methods for behavior analysis, which comprise a learning algorithm of the input training population in prior, such as unsupervised clustering approach based on similarity measure of the behavioral features, or example-based behavior recognition algorithm.

In the exemplary method by learning algorithm, the clusters of trajectories can be separated by determining the probability density function (pdf) of the trajectories. The trajectories of the tracking for a plurality of persons are accumulated over a period of time to be clustered into classes. It can utilize the probability density function (PDF) of the trajectories in the scene automatically by tracking objects over image sequences. The PDFs can be represented by a distribution of vectors, which are placed by a neural network implementing vector quantization. The temporal nature of the trajectories is modeled using a type of neuron with short-term memory capabilities. Once the model for the PDF of the trajectories has been determined, any predefined trajectories of interest can be flagged out and used to signal for a particular behavioral pattern.

In another exemplary embodiment, the example-based behavior recognition algorithm can force the output of one of the trajectory classes to be the given example behavior so that the neural network creates a cluster for the trajectories similar to the representative example. Then, the system can use a number of examples of the trajectories and Support Vector Machines to learn the class of example trajectories.

Another Embodiment Based on Demographics

FIG. 8 shows overall processes of the segmentation based on automatic behavior analysis and demographic analysis in another exemplary embodiment of the present invention.

In the exemplary embodiment shown in FIG. 8, the present invention can process the segmentation 260 based on the behavior analysis 480 of the people in a physical space, as described in regards to FIG. 7. In addition to the behavioral characteristics, the present invention can also utilize other types of visual characterization, such as demographic classification 814, to segment the plurality of persons in another exemplary embodiment, as shown in FIG. 8. In this exemplary embodiment, the present invention processes a plurality of input images in order to process a video-based demographic analysis of each person in the plurality of persons, and segments the plurality of persons by applying segmentation criteria to the output of the demographic analysis of the plurality of persons.

The present invention can provide demographic segmentation of the physical space shoppers by gender and age group. In this exemplary embodiment, the shopping behavior of each demographic group can be analyzed to obtain segment-specific insights. Understanding segment-based shopper behavior for a specific physical space can help to develop effective customer-centric strategies to increase the basket size and loyalty of highest-opportunity segments.

The present invention can utilize any reliable demographic classification method in the prior art as an exemplary video-based demographic analysis of the people. For example, the above-mentioned U.S. Provisional Pat. No. 60/808,283 of Sharma, et al. (Sharma 60/808,283) disclosed an exemplary demographic composition measurement based on gender and ethnicity. Age is also another attribute that Sharma 60/808, 283 can measure.

Segmentation based on the demographic analysis of the people in a physical space, such as a retail space, can provide unique benefits to the owner of a particular embodiment of the present invention. For example, the detailed segmentation output data per demographic groups can be a very useful market analysis data in an exemplary embodiment of the present invention.

Another Embodiment Based on Additional Input

FIG. 9 shows overall processes of the segmentation utilizing additional input in addition to automatic behavior analysis and demographic analysis in another exemplary embodiment of the present invention.

The present invention can further utilize additional input sources, such as sales data, to segment the plurality of persons in another exemplary embodiment. In this exemplary embodiment, the present invention receives additional input in regards to the plurality of persons, and segments the plurality of persons by applying segmentation criteria to the additional input. Examples of the additional input can comprise transaction data by the plurality of persons. Exemplary transaction and loyalty data can be associated with the behavior analysis in the present invention. The date, time and lane number in the exemplary transaction and loyalty data can provide the information to link a transaction with the corresponding shopping trip and behavior data in the present invention. The member ID number can also allow classification of the transaction by lifestyle group.

FIG. 10 shows overall processes of the segmentation, in which a rule application module is used for applying segmentation criteria at the segmentation process in another exemplary embodiment of the present invention.

In the exemplary embodiment shown in FIG. 10, the present invention can utilize a rule application logic module 981 for applying the segmentation criteria to the behavior analysis data. The logic module enables dynamic rule application, where the segmentation can be adjusted in a much easier and structured way based on the rules, which represents the segmentation criteria, defined in the module, rather than relying on an ad-hoc solution or static hard-code.

Output of the Segmentation

FIG. 11 shows an exemplary segmentation data collection and storage process in an exemplary embodiment of the present invention.

In the exemplary embodiment, the system can store the data in a table 660, where each track has fields of values: exemplary attributes can be time stamps (start time 662 and end time 663 of the video-based tracking sequence 429), behavior class by the behavior analysis measurement 483 process, demographic class by the demographic composition measurement 815 process, segmentation labels, and so on.

The exemplary data can be used to collect statistics 635 of the behavior analysis, demographic composition of the customers, and segmentation labels. The statistics 635 can be represented as layers of information, map, table, pie chart 630, as bar graph 637, or any data representation means in the exemplary embodiment. The data is accessible by the programming module, so that the system can directly and automatically utilize the statistical data for the segmentation.

FIG. 12 shows exemplary pie charts of the exemplary segmentation, where the pie charts provide useful segmentation information to the decision maker, who owns an embodiment of the present invention, in a physical space.

In the exemplary embodiment in FIG. 12, the exemplary "pie chart 1" 631 shows the percentage of the accumulated segmentation labels, "segmentation label 1", "segmentation label 2", and "segmentation label 3", which show an exemplary segmentation data composition in a physical space during a predefined window of time. Other types of relevant information to the segmentation can also be represented in the exemplary pie charts. The exemplary "pie chart 2" 632 divided the behavior patterns into three different behavior categories. The exemplary "pie chart 3" 633 further divided the behavior patterns into "passing by", "noticing", "stopping", "from engaging 1 to engaging P-1", and "purchase". There can be multiple engaging levels between the "engaging 1" and the "engaging P-1".

In these exemplary pie charts, the relationship between the "pie chart 1" 631 and the "pie chart 2" 632 and "pie chart 3" 633 can be defined by the segmentation criteria. For example, the segmentation criteria can assign "segmentation label 1" to "passing by" and "noticing" behavior patterns, "segmentation label 2" to "stopping" and "engaging 1" behavior patterns, and "segmentation label 3" to "from engaging 2 to engaging P-1" and "purchase" behavior patterns in the behavior analysis.

The present invention enables the decision maker, who owns an embodiment of the present invention in a physical space, to query the statistical data, which is processed based on the actual measurement for the customers' shopping behaviors.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for segmenting a plurality of persons in a physical space based on behavior analysis of the plurality of persons, comprising the following steps of:
   a) processing path analysis of each person in the plurality of persons based on tracking of the person in a plurality of input images captured by a plurality of means for capturing images using at least a means for control and processing,
   b) processing behavior analysis of each person in the plurality of persons,
   c) processing a video-based demographic analysis of each person in the plurality of persons,
   d) constructing segmentation criteria for the plurality of persons based on a set of predefined rules, and
   e) segmenting the plurality of persons by applying the segmentation criteria to outputs of the behavior analysis and the demographic analysis for the plurality of persons,
   wherein attributes of the path analysis comprise information for initial point and destination, coordinates of the person's position, temporal attributes, including trip time and trip length, and average velocity, and
   wherein the outputs of the behavior analysis comprise a sequence of visits or a combination of visits to a predefined category in the physical space by the plurality of persons.

2. The method according to claim 1, wherein the method further comprises a step of differentiating levels of segmentation in a network of the physical spaces,
   wherein first segmentation criteria are applied throughout the network, and
   wherein second segmentation criteria are applied to a predefined subset of the network of the physical spaces to serve specific needs of the predefined subset.

3. The method according to claim 1, wherein the method further comprises a step of sampling of a subset of a network of the physical spaces rather than segmenting all physical spaces in the network of the physical spaces.

4. The method according to claim 1, wherein the method further comprises a step of assigning a segmentation label to each person in the plurality of persons during a predefined window of time.

5. The method according to claim 1, wherein the method further comprises a step of constructing the segmentation criteria based on a combination of a set of predefined rules, whereby population in the physical space is divided into subpopulations by the combination of rules.

6. The method according to claim 1, wherein the method further comprises a step of constructing the segmentation criteria based on application of a learning algorithm based behavior analysis to a training population,
   wherein clusters of trajectories are separated by determining probability density function of the trajectories.

7. The method according to claim 1, wherein the method further comprises a step of constructing the segmentation criteria based on example-based behavior analysis algorithm,
   wherein one of trajectory classes is made as an example behavior so that a neural network creates a cluster for trajectories similar to the example behavior.

8. The method according to claim 1, wherein the method further comprises a step of applying different segmentation criteria per each segmentation group.

9. The method according to claim 1, wherein the method further comprises a step of defining domain-specific criteria for the segmentation criteria, whereby the domain-specific criteria comprise criteria that are constructed based on retail-specific rules.

10. The method according to claim 1, wherein the method further comprises steps of
    a) receiving additional input in regards to the plurality of persons, and
    b) segmenting the plurality of persons by applying segmentation criteria to the additional input,
    whereby the additional input comprises transaction data by the plurality of persons.

11. The method according to claim 1, wherein the method further comprises a step of utilizing a rule application logic module for applying the segmentation criteria to the behavior analysis data.

12. The method according to claim 1, wherein the method further comprises a step of representing the output of the segmentation using layers of information.

13. An apparatus for segmenting a plurality of persons in a physical space based on behavior analysis of the plurality of persons, comprising:
    a) a plurality of means for capturing images that capture a plurality of input images,
    b) at least a means for control and processing that is programmed to perform the following steps of:
    processing path analysis of each person in the plurality of persons based on tracking of the person in the plurality of input images,
    processing behavior analysis of each person in the plurality of persons,
    processing a video-based demographic analysis of each person in the plurality of persons, constructing segmentation criteria for the plurality of persons based on a set of predefined rules, and
    segmenting the plurality of persons by applying the segmentation criteria to outputs of the behavior analysis and the demographic analysis for the plurality of persons,
    wherein attributes of the path analysis comprise information for initial point and destination, coordinates of the person's position, temporal attributes, including trip time and trip length, and average velocity, and
    wherein the outputs of the behavior analysis comprise a sequence of visits or a combination of visits to a predefined category in the physical space by the plurality of persons.

14. The apparatus according to claim 13, wherein the apparatus further comprises means for differentiating levels of segmentation in a network of the physical spaces,
    wherein first segmentation criteria are applied throughout the network, and
    wherein second segmentation criteria are applied to a predefined subset of the network of the physical spaces to serve specific needs of the predefined subset.

15. The apparatus according to claim 13, wherein the apparatus further comprises means for sampling of a subset of a network of the physical spaces rather than segmenting all physical spaces in the network of the physical spaces.

16. The apparatus according to claim 13, wherein the apparatus further comprises means for assigning a segmentation label to each person in the plurality of persons during a predefined window of time.

17. The apparatus according to claim 13, wherein the apparatus further comprises means for constructing the segmentation criteria based on a combination of a set of predefined rules, whereby population in the physical space is divided into subpopulations by the combination of rules.

18. The apparatus according to claim 13, wherein the apparatus further comprises means for constructing the segmentation criteria based on application of a learning algorithm based behavior analysis to a training population,
wherein clusters of trajectories are separated by determining probability density function of the trajectories.

19. The apparatus according to claim 13, wherein the apparatus further comprises means for constructing the segmentation criteria based on example-based behavior analysis algorithm,
wherein one of trajectory classes is made as an example behavior so that a neural network creates a cluster for trajectories similar to the example behavior.

20. The apparatus according to claim 13, wherein the apparatus further comprises means for applying different segmentation criteria per each segmentation group.

21. The apparatus according to claim 13, wherein the apparatus further comprises means for defining domain-specific criteria for the segmentation criteria, whereby the domain-specific criteria comprise criteria that are constructed based on retail-specific rules.

22. The apparatus according to claim 13, wherein the apparatus further comprises
a) means for receiving additional input in regards to the plurality of persons, and
b) means for segmenting the plurality of persons by applying segmentation criteria to the additional input,
whereby the additional input comprises transaction data by the plurality of persons.

23. The apparatus according to claim 13, wherein the apparatus further comprises means for utilizing a rule application logic module for applying the segmentation criteria to the behavior analysis data.

24. The apparatus according to claim 13, wherein the apparatus further comprises means for representing the output of the segmentation using layers of information.

* * * * *